United States Patent [19]
Christophel

[11] 3,976,243
[45] Aug. 24, 1976

[54] GAS FUEL CONTROL SYSTEM FOR MULTIPLE BROODER INSTALLATIONS

[75] Inventor: Reuben L. Christophel, Harrisonburg, Va.

[73] Assignee: Shenandoah Manufacturing Co. Inc., Harrisonburg, Va.

[22] Filed: June 10, 1975

[21] Appl. No.: 585,716

[52] U.S. Cl. .................................. 236/6; 119/32; 236/1 A; 237/3
[51] Int. Cl.² .................................. A01K 31/20
[58] Field of Search ............... 237/3; 236/6, 3, 1 A; 119/31, 32

[56] References Cited
UNITED STATES PATENTS

| | | | |
|---|---|---|---|
| 1,076,576 | 10/1913 | Hohoff | 237/3 |
| 1,197,343 | 9/1916 | Charlesworth | 236/6 X |
| 2,240,571 | 5/1941 | Olson et al. | 119/32 |
| 2,669,392 | 2/1954 | Schwanger et al. | 119/32 X |
| 2,985,137 | 5/1961 | Horne | 119/32 |
| 3,139,858 | 7/1964 | Martin | 119/31 |

Primary Examiner—William E. Wayner
Assistant Examiner—William E. Tapolcai, Jr.
Attorney, Agent, or Firm—Mason, Fenwick & Lawrence

[57] ABSTRACT

A gas fuel supply control system for a plurality of poultry brooders arranged in a series and each having a gas fired main burner. The control system includes an electrically activated main gas regulating valve device electrically controlled by electrical signals from a thermostatic switch to open and close it at predetermined temperature levels, and regulate the gas fuel supply through a main burner manifold to all of the brooder main burners. A non-electrical self-operating hydraulic snap valve device having a temperature sensing fluid which directly effects valve opening and closing forms a bypass around the electrically activated regulating valve device and is set to operate at a slightly lower temperature to take over automatic control of the gas supply to the manifold during electrical power failure disabling the electrically activated valve.

10 Claims, 5 Drawing Figures

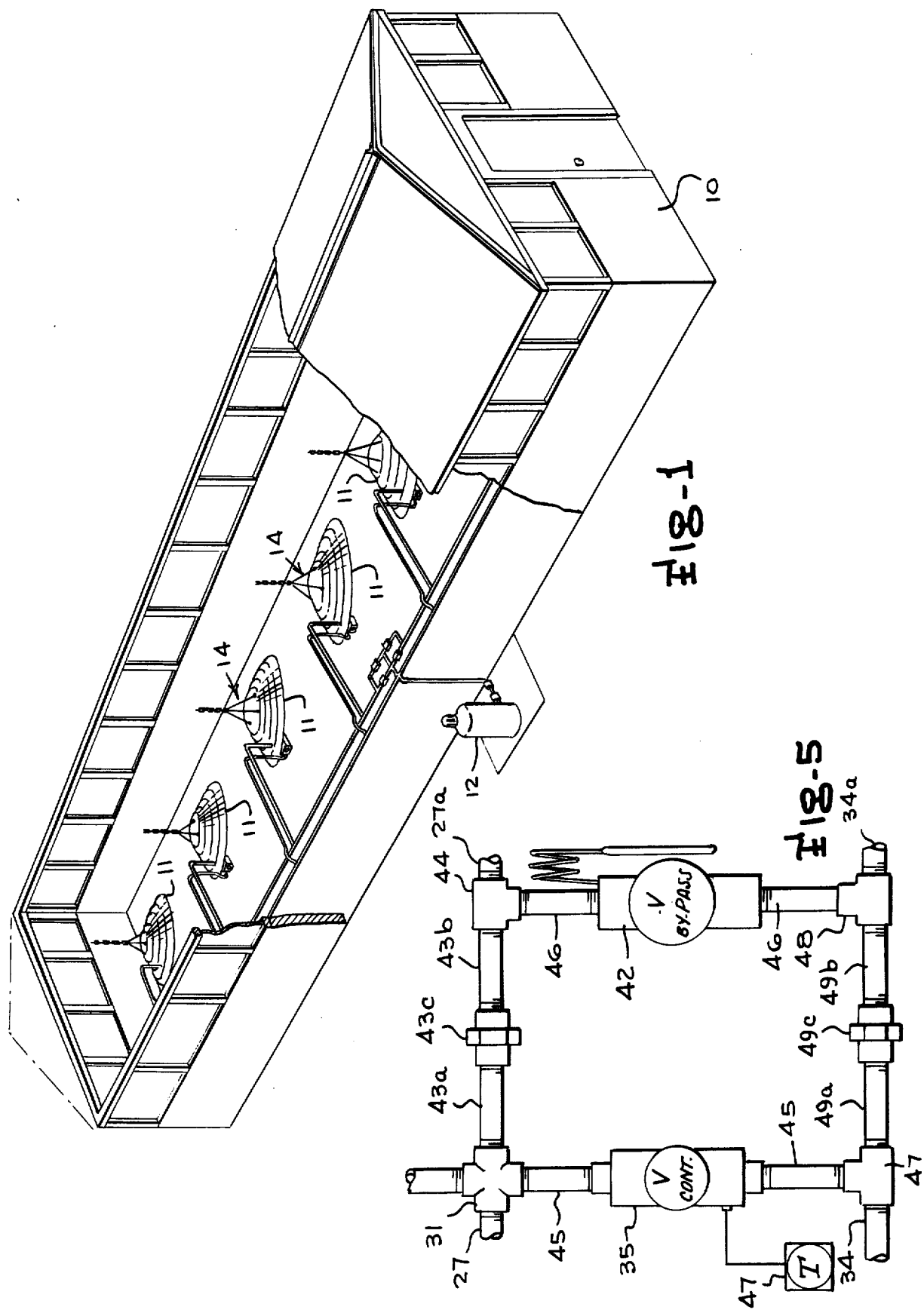

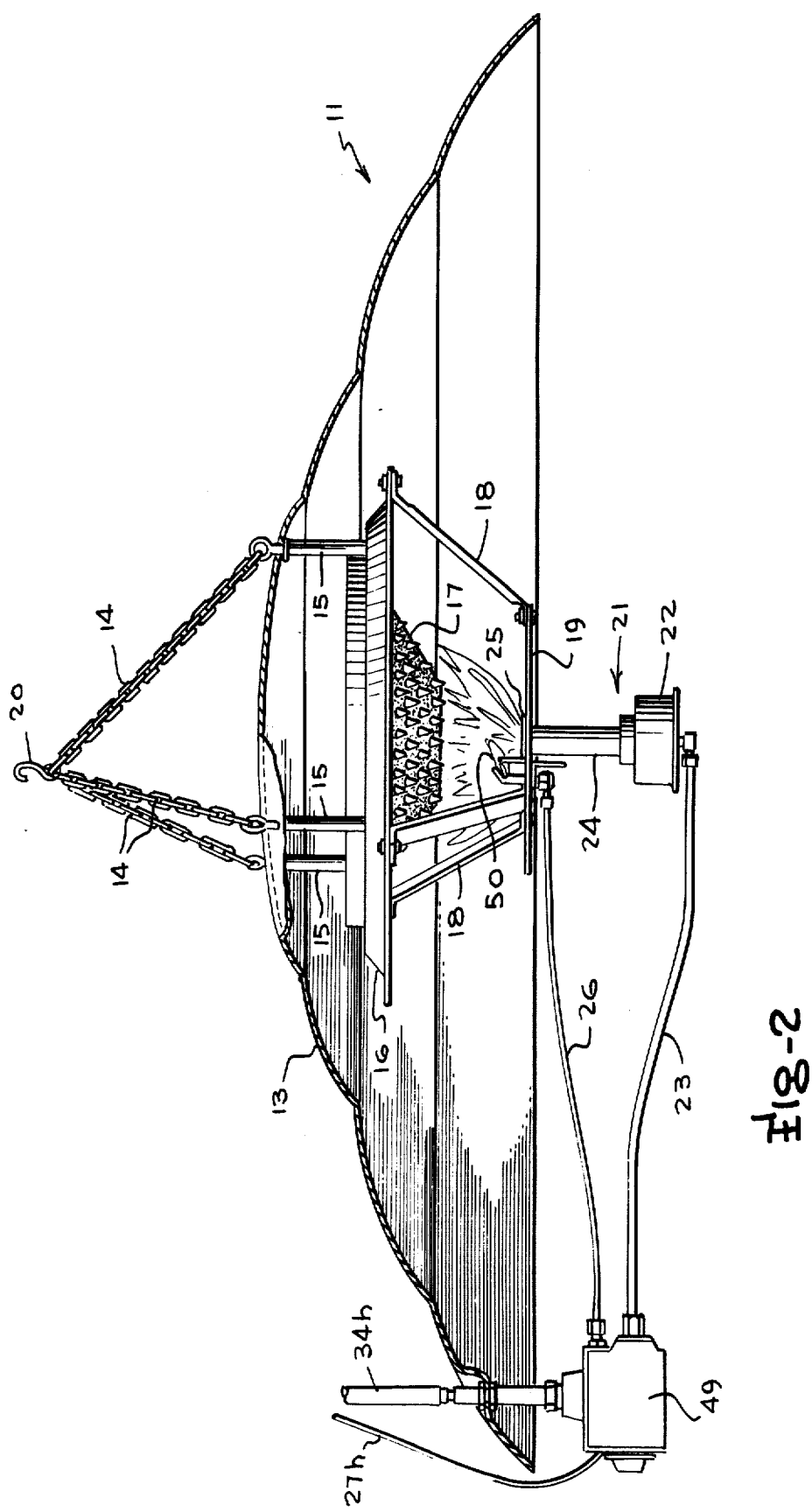

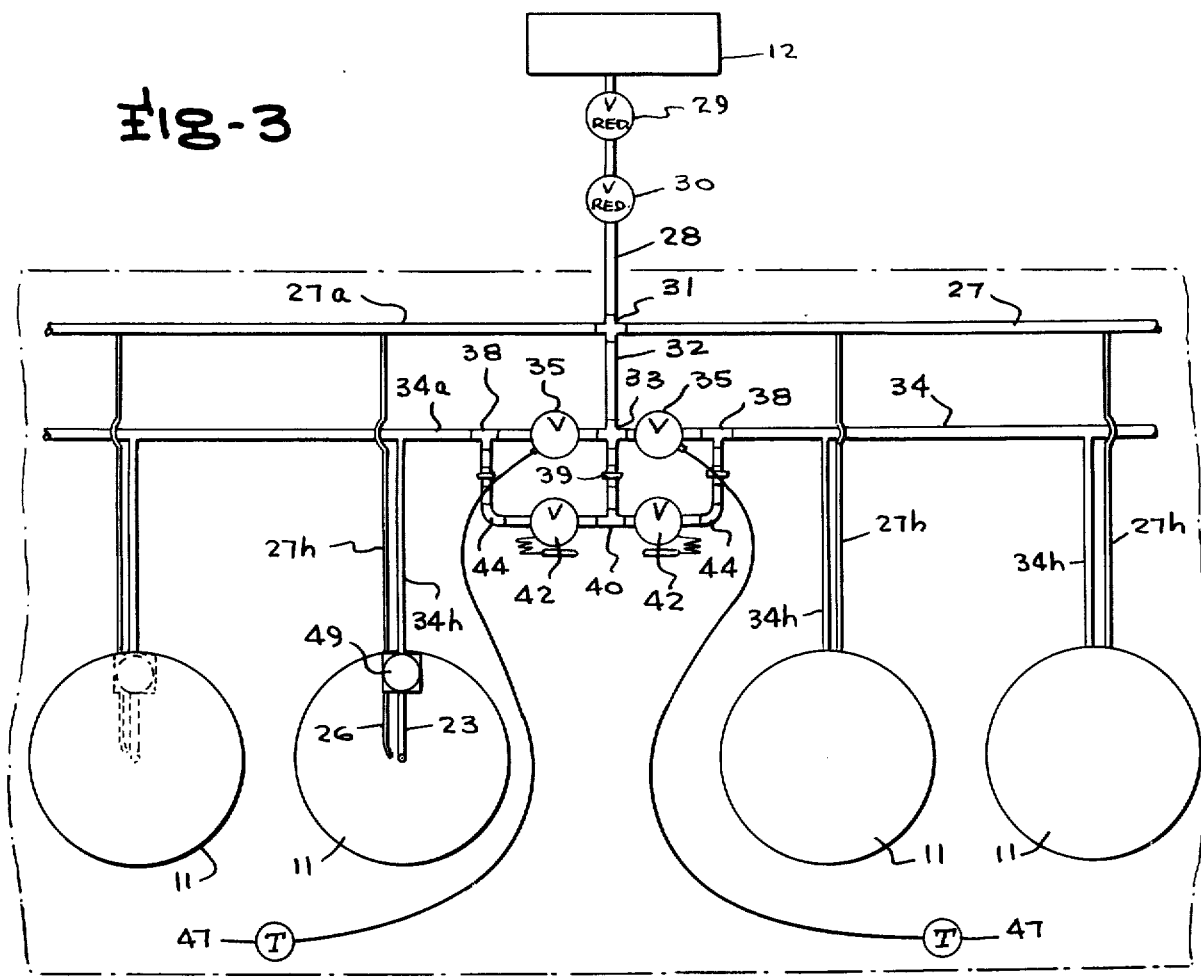
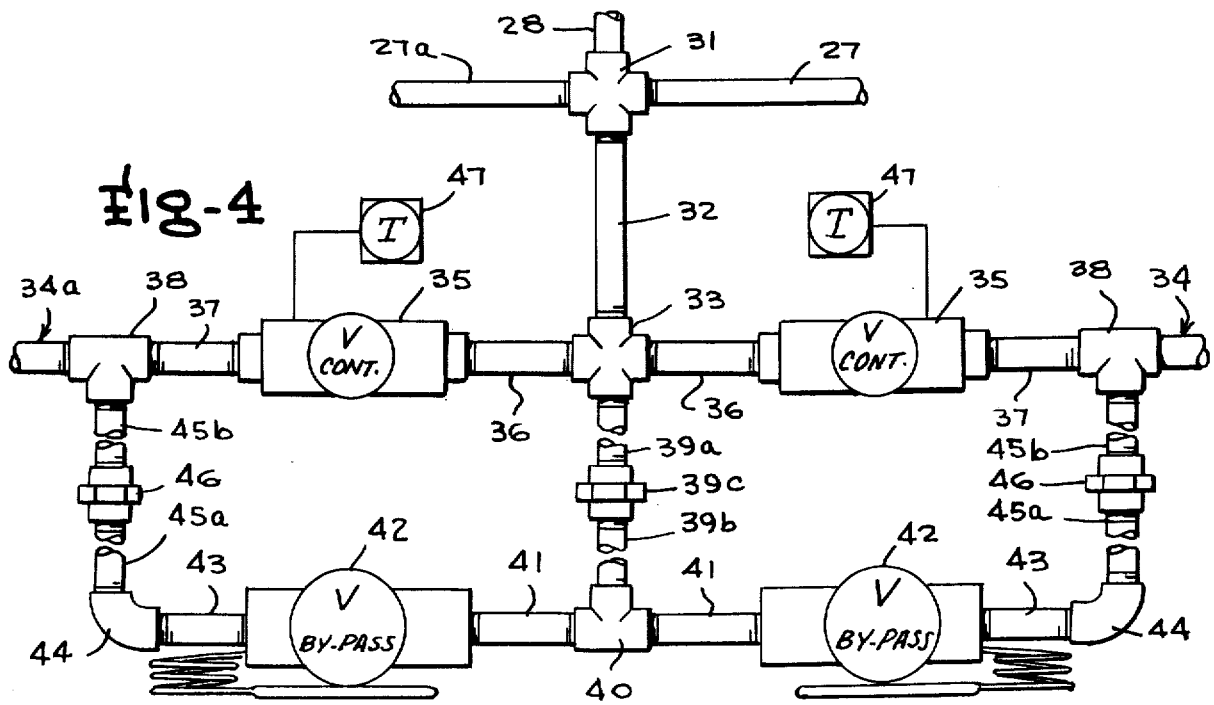

GAS FUEL CONTROL SYSTEM FOR MULTIPLE BROODER INSTALLATIONS

BACKGROUND AND OBJECTS OF THE INVENTION

The present invention relates in general to fuel supply control systems for multiple poultry brooders in a brooder house or poultry house installation, and more particularly to automatic gas fuel supply control systems for multiple poultry brooders and to multiple brooder installations wherein dual zone control can be provided providing the option of controlling gas brooders with thermostats at plural locations in the brooder house for large installations where variations in temperature at different parts of the brooder house may occur.

Heretofore, many different types of poultry brooders have been provided, some of which are of the hot water heated type, others of which are of the electrically heated type, and the most common of which are gas burner heated types. The present application has to do with the gas burner types of brooders provided with controls for regulating the supply of the gaseous fuel, and which are connected together to a single source of fuel supply. It will be understood that brooders of the type here concerned are suspended, for example by chain and sometimes pulley type suspension systems, or otherwise conventionally supported, at spaced intervals throughout a poultry house or brooder house to enable the young chicks to keep warm. The brooders are conventionally arranged in a long series of brooders spaced conventionally about 24 – 30 inches above the litter material, usually formed from wood chips, sawdust, corn cobs and the like covering the floor of the poultry house, with the brooders alined in one or more rows extending the length of the brooder house and typically spaced from each other, for example, with their centers located about 6–10 feet apart for brooders having a hover or canopy about 4 feet in diameter. Frequently the brooder houses are 300 feet or more in length, which would call for about 30 to 40 brooders in each row spanning the length of the brooder house, and in many very large or long brooder house installations, rows of up to about 76 brooders may be called for.

One severe problem that has been encountered in connection with multiple gas burning poultry brooder installations having automatic thermostatic controls for regulating the gas fuel supply to the brooder burners in accordance with the space temperature in the brooder house has been that such multiple brooder installations, conventionally having electrical thermostat controls, are critically dependent on non-interruption of the electrical supply to the brooder house. In many rural areas, however, electrical power supply is much less dependable than in the more populated regions, and a failure of the electrical power to the brooder house, during cold weather seasons, may be fatal to large numbers of the chicks since loss of electrical power disables the thermostatic control of the gas fuel supply. Some efforts have been made to alleviate this problem by providing manually operated bypass systems for the automatic controls for the brooders, but this requires that a human operator be able to promptly manually shift the brooder controls over to manual bypass condition within a short period of time after the power failure occurs, if the brooder temperatures are to be maintained at levels which will not injure the chicks.

An object of the present invention is the provision of a gas fuel supply control system for multiple gas burning poultry brooders in a large brooder installation, wherein the gas supply control system is capable of controlling a large number of brooders in a series and has means automatically operative without electrical supply to effect temperature controlled regulation of the gas supply to the brooders in the series in the event an electrical power failure disables conventional electrical thermostatic gas control means for the series of brooders causing a predetermined small reduction in temperature in the brooder region.

Another object of the present invention is the provision of a plurality of gas burner type brooders connected in series to a common temperature responsive electrical thermostatic type gas supply control for normally regulating the gas supply to the brooder burners to maintain predetermined temperature levels in the brooder house, in association with a self-actuating temperature sensitive bypass control responsive to contraction of a temperature sensitive fluid in a fluid circuit including a sensing bulb to automatically open a bypass gas supply circuit to the brooder burners and automatically effect temperature sensitive regulation thereof responsive to lowering of the temperature in the brooder house to a predetermined level slightly below the normal temperature being maintained by the electrical thermostatic control system.

Another object of the present invention is the provision of a plural zone control system for a plurality of gas burner type brooders wherein brooders are arranged in plural series or groups of interconnected brooders each series or group of which have a common electrical thermostatic regulated gas fuel supply control for the brooder burners of the associated group together with a self-actuating bypass control operated by a temperature sensitive fluid upon occurrence of brooder house temperatures signifying electrical power failure to take over temperature regulation of the brooder burners during the period the electrical power failure persists. With such a system, zone control can be achieved in the brooder house by a plurality of thermostats each associated with respective sets or groups of the brooders to achieve more effective maintenance of desired temperatures at all regions of a large brooder house.

Other objects, advantages and capabilities of the present invention will be apparent from the following detailed description, taken in conjunction with the accompanying drawings illustrating preferred embodiments of the invention.

BRIEF DESCRIPTION OF THE FIGURES

FIG. 1 is a perspective view of a poultry brooder house, partly broken away to show some of the brooders of a multiple brooder installation of the present invention;

FIG. 2 is a side elevation view, partly broken away, of a typical brooder unit used in the installation of the present invention;

FIG. 3 is a fragmentary schematic diagram of a dual zone control multiple gas brooder installation of the present invention;

FIG. 4 is a diagrammatic view, to enlarged scale, of the manifold assembly portion of the dual zone control system of FIG. 3; and FIG. 5 is a diagrammatic view, to enlarged scale, of the manifold assembly portion of a single zone control multiple gas brooder installation.

DETAILED DESCRIPTION OF A PREFERRED EMBODIMENT

Referring to the drawings, wherein like reference characters designate corresponding parts throughout the several figures, and referring particularly to FIGS. 1 to 3, the present invention is directed to a multiple gas brooder system for a typical elongated poultry brooder house, indicated generally by the reference character 10 in FIG. 1, wherein a large number of gas burner type brooder units, indicated generally by the reference character 11, are arranged in one or more longitudinal rows of brooders spaced from each other in accordance with typical brooder locating practices to span the length of the elongated brooder house. The brooder units 11 in the installation herein illustrated are arranged in a single row extending lengthwise of the brooder house to be supplied with a gaseous fuel, such as natural gas or liquid propane, through a suitable system of conduits communicating with a single source of the gaseous fuel, such for example as a typical 1000 gallon tank of pressurized gas, for example, liquid propane gas, indicated by the reference character 12 in FIG. 1. In the illustrated example, it will be assumed that the brooder house 10 is of such length as to call for about 60 brooder units 11 arranged in a single row, arranged in 2 longitudinally alined groups or series of 30 brooders each, although only 5 brooders are shown in FIG. 1 for simplicity of illustration. Obviously other numbers and arrangements of brooders may be employed using the control system of the present invention, up to, for example, about 38 brooders in each group or set, permitting dual zone control for 2 zone groups or sets of 38 brooders each, which may be arranged in a single row extending lengthwise of the brooder house or the brooders of each group or set may be arranged in 2 or more parallel rows as desired. If less than 38 brooders are required, for a liquid propane gas system, or less than 24 brooders are required for a natural gas system, then only a single zone control as hereinafter described is required as the single zone control system can accommodate up to the 38 brooders for a liquid propane gas system or 24 brooders for a natural gas system.

The individual brooder units 11 making up the longitudinal array or row of brooders is of typical construction, and comprises a hover, canopy or hood 13, as shown in FIG. 2, usually formed of sheet metal, for example aluminum or galvanized metal, which provides a bright surface for more efficiently reflecting radiant heat energy downward toward the floor of the poultry house, and shaped to conform generally to a portion of a hollow sphere. In the illustrated embodiment, the hover is of somewhat stepped or terraced configuration providing a series of annular upwardly convex portions, although other conventional shapes may be used for the hover. The hover 13 is adapted to be mounted with its circular edge horizontal and spaced from the floor of the brooder house, for example, initially at a height of about 28 to 30 inches above the litter, and may be raised in height as desired to meet varying temperature conditions. In one illustrated embodiment, the hover 13 of each brooder unit may be hung from three chains, indicated at 14, each of which has one end attached to one of the three eye bolts located immediately above the top surface of the hover and fixed by spacer rods 15 to an annular reflector pan 16 supporting a downwardly facing, frusto-conical or frusto-pyramidal ceramic radiant 17 and supporting by means of downwardly extending mounting brackets 18 an annular burner plate 19. The other end of each of the chains 14 is engaged over one end of a steel S-hook 20, which is engaged in a light block and tackle utilized to raise and lower the hover for cleaning purposes and to increase the spacing between the hover 13 and the floor as desired. Alternatively, instead of hanging each brooder unit individually by its chain system 14, each connected to a separate block and tackle system, a series of brooders may be suspended by their chains from an elongated bar which in turn is supported by one or more block and tackle systems to concurrently raise and lower the series of brooders suspended from the single support bar.

The gas burner system for each brooder unit is supported from the annular burner plate 19, and if desired from a second depending supporting bracket or post secured to the hover 13 near its perimeter, and comprises a burner unit indicated generally at 21 comprising a generally cylindrical air mixing chamber 22 having a main burner orifice in its bottom center connected by a fitting to the main gas line 23 and having air inlet openings, for example four, one inch air inlet holes in its bottom, and having a vertically extending venturi 24 rising from the air mixing chamber 22 and terminating above the burner plate 19 in a primary combustion section 25 producing the flame and directing it against the ceramic radiant 17. A pilot gas line 26 also projects generally radially inwardly from the perimeter of the hover to the burner unit and provides an outlet orifice producing a pilot flame adjacent the primary combustion section 25 to ignite the gas and air mixture of the main burner when the gas is supplied to the main gas line 23.

Customarily, each brooder unit would have its own automatic thermostatic control and pilot safety shutoff, to which the main gas line 23 and pilot gas line 26 are connected adjacent the perimeter of the hover and provided with a heat sensing thermostatic device of some kind to automatically cut on the main gas supply to the hover burner when the temperature at the associated brooder falls to a predetermined cut-on temperature level. A thermocouple of conventional construction is mounted immediately adjacent the pilot flame, to close both the pilot and main gas valves if pilot failure occurs.

Referring now more particularly to FIGS. 3 and 4, the present invention involves elimination of the automatic thermostatic gas controls associated with each individual brooder unit and provides a manifold assembly, illustrated more particularly in FIG. 4, providing one electrically operated thermostatic control valve for each zone group or zone set of brooders, together with a self-actuating capillary bypass control paralleling each electrically operated thermostatic control, which is spring operated responsive to contraction of a temperature sensitive fluid to provide regulated gas supply to all of the brooders in the event of electrical power failure disabling the electrically operated thermostatic control. The pilot gas lines 26 for all of the brooders are connected to pilot line manifold branches 27, 27a branching from the main gas supply line 28 extending from the supply tank 12. In accordance with the conventional practice, assuming that the liquid propane gas in the main supply tank 12 may be at a pressure of approximately 100 pounds per square inch, first and second stage reduction devices 29 and 30 may be provided to reduce the pressure to ten pounds per square inch between the devices 29 and 30 and to conventional operating pressures of about eleven inches of water column pressure downstream of the second stage reduction device 30. The two pilot line branch manifolds 27,27a may be connected to the main supply line 28 by a conventional 1 inch cross fitting as indicated at 31 in FIG. 4. A short length of 1 inch diameter pipe, for example, a five inch section, may provide the final main supply line section, indicated at 32 in FIG. 4, and have a 1 inch cross fitting 33 connected at its downstream end. The two lateral ports of the cross fitting 33 provide two branch manifolds, generally indicated at 34 and 34a for the main gas supply to the main gas line 23 of the brooders, and are connected through main electrically operated thermostatic gas controls 35 having their inlets connected by, for example, 2½ inch long sections of one inch pipe, indicated at 36, connected to the two lateral branch outlet ports of the cross fitting 33 and having their outlets connected by similar 2½ inch long, 1 inch diameter sections 37 to one inch T-fittings 38 as shown in FIG. 4. The electrically operated thermostatic gas controls 35 may be provided by UNITROL 7000 GVEHC120 combination gas controls manufactured by Robertshaw Controls Company, Richmond, Va., for example, embodying the construction disclosed in U.S. Pat. No. 3,513,873 granted May 26, 1970 to M. M. Graham et al. and assigned to Robertshaw Controls Company, wherein electrical demand signals from a remote, space temperature sensing thermostat activate an electromagnetic device internal in the control device, to condition internal bleed lines to produce a pressure differential across a main diaphragm valve causing it to move to an open position admitting the main gas supply to the main supply branch manifold 34 or 34a served by the control device.

The third outlet port of the cross fitting 33 is joined to a pair of serially connected one inch diameter pipe sections, for example two, 2½ inch sections, 39a, 39b interconnected by union 39c, which are connected to a T-fitting 40 whose branches are connected respectively to short pipe sections such as 2½ in. pipe sections 41 connected to the inlets of hydraulic snap action control devices 42 having a thermostatic device for applying mechanical force to internal structure in the control device 42 to position its main valve in open or closed positions depending on the temperature sensed. For example, a temperature sensing bulb may be mounted directly on the unit or connected to it by a fluid conduit containing temperature sensitive fluid that expands and contracts upon increases and decreases in the temperature sensed by the bulb and having, for example, an internal spring biasing a movable element whose position is influenced by the temperature sensitive fluid to regulate internal bleed lines and establish differential pressures across a main diaphragm valve to move the valve to open position and couple the main gas supply section 39a, 39b to the outlet of the control device 42 when the temperature sensed falls below a predetermined temperature setting slightly lower than the temperature setting of electrical control valve 35. The important thing is that the control valve device 42 does not need any external electrical power source but is capable because of the contraction and expansion of the temperature sensitive fluid to be self-operating to regulate the gas supply to the main supply branch manifolds 34 and 34a in the event of electrical power failure disabling the control devices 35. An example of a commercial device which may be used for the self-operating hydraulic snap valve type controls 42 is the UNITROL 7000 GVSHC combination gas control manufactured by Robertshaw Control Company, Richmond, Va., which may, for example, be of the construction of the FIG. 1–4 embodiment disclosed in U.S. Pat. No. 3,235,180 granted Feb. 15, 1966 to M. M. Graham et al and assigned to Robertshaw Controls Company. The main outlet ports of the self-actuating hydraulic snap valve controls 42 are connected by short one inch diameter pipe sections, for example, 2½ inch long sections 43, ell fittings 44, and serially connected 2½ in. sections 45a, 45b interconnected by unions 46 to the lateral ports of the T-fittings 38, whose outlet ports are joined to the main supply branch manifolds 34, 34a.

Each of the electrically operated thermostatic gas control valve units 35 are connected by electrical wiring to space temperature sensing thermostats, indicated diagrammatically at 47 in FIG. 3, which may, for example, be Penn A19 space thermostats, or thermostats of any other conventional design located, for example, about 3–5 feet above the floor of the brooder house in the location desired relative to the zone group of brooders regulated by the associated electrically operated control valve 35, for example, about midway along the length of the zone group or adjacent the supply end of the zone group, as desired by the operator. The temperature sensing bulbs of the hydraulic snap valve type control devices 42, which normally have temperature sensitive fluid lines not exceeding 5 feet in length, are preferably positioned close to the manifold assembly and are set at a temperature, for example, about 3°F. below the cut-on temperature for the electrically operated thermostat gas controls 35 so that if power fails, a drop in temperature in the zone being monitored of about 3° will cause the hydraulic snap valve type control devices 42 to cut on and begin regulating the gas supply through the bypass channel of the manifold assembly until electrical power is restored. In the normal installation, the main supply branch manifolds 34, 34a and the pilot line branch manifolds 27, 27a would run overhead above or laterally offset from the centers of the brooders and 2 flexible hoses 34h, 27h would drop down from the branch manifolds to supply the pilot and main burners to each brooder. Also, each brooder would be provided with a conventional automatic pilot control valve, indicated at 49, interposed in the main and pilot gas lines 23 and 26 for each brooder adjacent the perimeter of the hover or canopy, connected to the conventional thermocouple, for example, indicated at 50 in FIG. 2, adjacent the pilot flame to generate electrical signals supplied to the automatic pilot control valve to maintain a pilot valve and a main valve in the automatic pilot control open so long as the pilot is burning. Such a pilot valve is manually opened for lighting the pilot, and is kept open by the heated thermocouple so long as the pilot remains lit. If pilot failure occurs, the thermocouple closes both the pilot and main valves interposed in the main gas line 23 and pilot gas line 26 for each individual brooder.

It will be understood that under normal conditions, the gas flow to the brooders with the above described system is controlled by the zone space temperature monitoring thermostats 47 through the electrically operated thermostatic gas control valve devices 35 regulating the supply to the main supply branch manifolds 34 and 34a. When the space thermostats 47 for either zone signifies demand for heat, indicating that the house temperature in the zone being monitored has fallen below the desired house temperature level, the associated electrically operated thermostatic gas control device 35 will open allowing gas flow to the associated main supply branch manifold. The hydraulic snap valve type control valves 42 in the bypass channels of the manifold assembly are kept closed by setting their thermostat controls 2° to 3° F below the desired house temperature. If an electrical current failure occurs and the house temperature begins to fall due to failure of operation of the electrically operated thermostat gas controls 35, the hydraulic snap valve type control devices 42 automatically open after the two to three degree temperature drop and regulate the supply of gas to the main supply branch manifolds 34, 34a. The electrically operated thermostatic gas controls 35, such as the GVEHC120 valves, are used during normal operation because of their superior sensitivity and ease of setting, while the hydraulic snap valve type control devices 42, such as the GVSHC valves, are, of course, useful in emergency situations because they do not require electrical power.

The above described dual zone control system is primarily designed for colder regions where there may be a greater variation in temperature in various parts of the poultry house. Also, the dual zone control having the electrically operated thermostatic gas control valve devices 35 in each of two branch circuits and having the two associated hydraulically operated control devices, are provided where the length or size of the brooder house is such that more than a maximum of 38 liquid propane gas brooders or 24 natural gas brooders must be controlled, since these are normally the maximum numbers that can be operated off one gas control device. Of course where the size of the brooder house dictates the two branch manifold system, the two dual zone controls can be operated by a single thermostat.

In cases where the number of brooders does not exceed the above described maximum for one main control device, a single zone control manifold assembly of the type illustrated in FIG. 5 may be used. In FIG. 5, the components which correspond to components in the FIG. 4 embodiments are indicated by the same reference characters as in the FIG. 4 embodiment. As shown in FIG. 5, the main supply pipe 28 from the gas supply source, such as the tank 12, is connected to a cross fitting 31 whose lateral ports are connected to the pilot line branch manifold 27 at one side and connect through a pair of serially connected 2½ inch sections 43a and 43b and union 43c to one lateral port of T-fitting 44 whose other lateral port is connected to pilot line manifold 27a. The downstream of cross fitting 31 connects through a 2½ inch pipe section 45 to the electrically operated thermostatic gas control device 35 like the device 35 of the FIG. 4 embodiment. The branch channel paralleling the electrically operated gas control device 35 is formed of a plurality of 2½ inch long, one inch diameter pipe sections 46 and the hydraulic snap valve type control device 42 like the device 42 of the FIG. 4 embodiment. These two parallel channels connect to two T-fittings indicated at 47 and 48 which are interconnected by two, 2½ inch long sections 49a, 49b and interconnecting union 49c and which are interposed at an intermediate point in the main gas supply manifold to the series of brooders, to subdivide the main supply manifold into two branch manifolds also indicated by reference characters 34 and 34a in FIG. 5. The electrically operated thermostat gas control 35 of the FIG. 5 embodiment is also connected by electrical wiring to a space temperature monitoring thermostat 47 like the thermostats 47 of the dual zone embodiment of FIGS. 3 and 4, and the individual brooders 11 are each provided with their own automatic pilot control, such as a Robertshaw TS10J Automatic Pilot Control, connected to a thermocouple monitoring the pilot flame to maintain the main valve open as long as the pilot is burning and to close both the pilots and main valves in the individual lines to the individual brooders if pilot failure occurs.

What is claimed is:

1. A gas fuel supply control system for a plurality of gas fired poultry brooders forming a common gas fed group to automatically regulate the supply of gas fuel to each brooder, each brooder having a gas fired main burner and a gas fired pilot burner and a burner inlet pipe and pilot inlet pipe for each brooder in the group, a gas fuel supply, a common pilot supply conduit system connected to said fuel supply and to the pilot inlet pipes of the brooder group and a common main burner supply conduit system connected at a feed connection to the fuel supply and to the main burner inlet pipes of the group, an electrically activated temperature controlled main control valve interposed in said burner supply conduit system adjacent said feed connection operated by electrical signals from an adjustable temperature sensing thermostat switch coupled thereto for regulating the supply of gas fuel through said burner supply conduit system when the adjacent space temperature falls below a predetermined temperature setting, and a bypass gas supply circuit connected across said main control valve and having a temperature responsive non-electrical gas flow regulating valve therein capable of self-operating mechanically at temperatures below the temperature setting of said thermostat switch to automatically assume regulation of the gas supply through the burner supply conduit system to the brooders during periods of electrical power failure disabling the electrical temperature controlled main control valve.

2. A gas fuel supply control system for brooders, as defined in claim 1, wherein said non-electrical gas flow regulating valve is a self-actuating hydraulic type control valve device having internal mechanical structure and a temperature sensitive fluid in a sensor device in direct force communication with the mechanical structure to open and close the control valve device to passage of gas fuel to the main burners responsive to contraction and expansion of the temperature sensitive fluid applying forces directly to the mechanical structure.

3. A gas fuel supply control system for brooders, as defined in claim 1, wherein said pilot supply conduit system is connected to the fuel supply upstream of the connection between the latter and the burner supply conduit system to supply gas for the pilot burners of the brooders along a path bypassing said primary control valve and said non-electrical valve.

4. A gas fuel supply control system for a plurality of gas fired poultry brooders arranged in a predetermined series to automatically regulate the supply of gas fuel to each brooder, each brooder having a gas fired main burner to effect heating of the space served by that brooder and a gas fired pilot burner and each brooder having a burner inlet pipe and pilot inlet line, a main supply conduit to be coupled to a source of gas fuel, a pilot manifold connected to said supply conduit and to the pilot inlet lines in the series for supplying gas thereto and a main burner manifold connected to said supply conduit and to the burner inlet pipes in the series for supplying gas fuel thereto, an electrically activated temperature controlled main control valve interposed in said burner manifold upstream of any burner inlet pipe connections thereto operated responsive to electrical signals from an adjustable temperature sensing thermostat switch coupled thereto set to cause opening of the control valve to supply gas to the main burners when the space temperature near the series of brooders falls below a predetermined temperature level, and a bypass conduit having a non-electrical, temperature controlled, mechanically self-operating bypass control valve therein having adjustable temperature sensing means set open at a predetermined temperature slightly below the temperature setting of said thermostat switch, said bypass conduit and bypass control valve communicating with the main supply conduit and burner manifold across said main control valve to provide a parallel gas flow path in bypassing relation to the latter for automatically taking over temperature responsive regulation of the gas supply to the main burners of the brooders in said series during periods of electrical power failure disabling said electrically activated main control valve.

5. A gas fuel supply control system for brooders, as defined in claim 4, wherein said non-electrical bypass control valve is a self-actuating hydraulic type control valve device having internal mechanical structure and a temperature sensitive fluid in a sensor device in direct force communication with the mechanical structure to open and close the control valve device to passage of gas fuel to the main burners responsive to contraction and expansion of the temperature sensitive fluid applying forces directly to the mechanical structure.

6. A gas fuel supply control system for brooders, as defined in claim 5, wherein said pilot manifold is connected to the main supply conduit upstream of the connection between the latter and the burner manifold to supply gas for the pilot burners of the brooders along a path bypassing said main control valve and said bypass control valve.

7. A gas fuel supply control system for brooders, as defined in claim 6, including valve means at each brooder connected to the burner inlet pipe and the pilot inlet line of the associated brooder and controlled by signals from thermocouple means adjacent the pilot burner to close the burner inlet pipe and pilot inlet line when the pilot flame becomes extinguished.

8. A gas fuel supply control system for regulating the supply of gas fuel to a plurality of gas fired poultry brooders arranged in first and second series of plural brooders alined in a single row, each brooder having a gas fired main burner to effect heating of the space served by that brooder and a gas fired pilot burner and individual burner and pilot inlet pipes for each brooder, a main supply conduit to be coupled to a source of gas fuel, a pair of pilot branch manifolds forming supply manifolds for each representative series connected to said main supply conduit substantially midway of said row of brooders and connected to the pilot inlet pipes for each brooder of the associated series, a pair of main burner branch manifolds forming supply manifolds for each respective series connected to the individual burner inlet pipes of the associated series and each having a feed end connected at a feed connection to the main supply conduit, an electrically activated temperature controlled primary control valve for each burner branch manifold interposed in the associated burner branch manifold adjacent the feed end thereof, operated responsive to electrical signals from an adjustable temperature sensing thermostat switch coupled thereto set to open at a predetermined space temperature adjacent the brooders for regulating the supply of gas fuel through the respective burner branch manifolds to all of the main burners of the associated series, and a bypass branch network having two bypass conduits connected at an adjoining end of each to said main supply conduit at said feed connection and connected respectively to said main burner branch manifolds just downstream of said primary control valves, each bypass conduit having a non-electrical self-operating temperature controlled bypass control valve therein of the type having adjustable temperature sensing means set to open the associated bypass control valve at a predetermined temperature slightly below the temperature setting of said thermostat switch for the primary control valve to provide a parallel gas flow path bypassing the latter for automatically taking over temperature responsive regulation of the gas supply to the main burners of the brooders in the associated series during periods of electrical power failure disabling said electrically activated temperature controlled primary control valves.

9. A gas fuel supply control system for brooders, as defined in claim 8, wherein said non-electrical bypass control valve is a self-actuating hydraulic type control valve device having internal mechanical structure and a temperature sensitive fluid in a sensor device in direct force communication with the mechanical structure to open and close the bypass control valve to passage of gas fuel to the main burners responsive to contraction and expansion of the temperature sensitive fluid applying forces directly to the mechanical structure.

10. A gas fuel supply control system for brooders, as defined in claim 9, wherein said pilot manifolds are connected to the main supply conduit upstream of the connection between the latter and the burner manifolds to supply gas for the pilot burners of the brooders along a path bypassing said primary control valve and said bypass control valve, said system including valve means at each brooder connected to the burner inlet pipe and the pilot inlet pipe of the associated brooder and controlled by signals from thermocouple means adjacent the pilot burner to close the burner inlet pipe and pilot inlet pipe when the pilot flame becomes extinguished.

* * * * *